United States Patent [19]
Holbrook

[11] 3,889,920
[45] June 17, 1975

[54] MOLD STRUCTURE FOR FABRICATING FLUID COLLECTION RECEPTACLES

[75] Inventor: Legrand K. Holbrook, Salt Lake City, Utah

[73] Assignee: Medical Development Corporation, Salt Lake City, Utah

[22] Filed: May 25, 1973

[21] Appl. No.: 363,850

Related U.S. Application Data

[63] Continuation-in-part of Ser. No. 98,566, Dec. 16, 1970, Pat. No. 3,738,381.

[52] U.S. Cl. .............................. 249/151; 249/177
[51] Int. Cl. ........................... B22c 9/24; B29c 1/14
[58] Field of Search ............ 425/242, 468; 249/144, 249/146, 147, 151, 177, 142, 175

[56] References Cited
UNITED STATES PATENTS

| | | | |
|---|---|---|---|
| 1,124,237 | 1/1915 | Torrey | 249/151 |
| 1,925,400 | 9/1933 | Nelson | 249/151 X |
| 2,890,490 | 6/1959 | Morin | 425/DIG. 34 X |
| 3,045,290 | 7/1962 | Anderson et al. | 425/468 X |
| 3,339,239 | 9/1967 | Peck | 425/468 X |
| 3,484,516 | 12/1969 | Simons | 425/129 X |
| 3,737,272 | 6/1973 | Segmuller | 425/468 X |

Primary Examiner—Francis S. Husar
Assistant Examiner—R. J. Charvat

[57] ABSTRACT

Mold structure for fabricating fluid-collecting receptacles. The mold structure comprises positive and negative molds, with the former including pin means for effecting both alignment of the molds as well as for forming elongate ports. Thus, mold alignment is assured so as to insure uniform wall thickness of the part to be made, this since both the part as well as the molds forming the part are held strictly on center line. Additionally, the ports or port extensions of the receptacle, in addition to themselves serving a useful purpose in the structure, provide access means whereby alignment pins of the positive mold may be used as guides relative to corresponding apertures in the negative mold.

7 Claims, 6 Drawing Figures

PATENTED JUN 17 1975　3,889,920
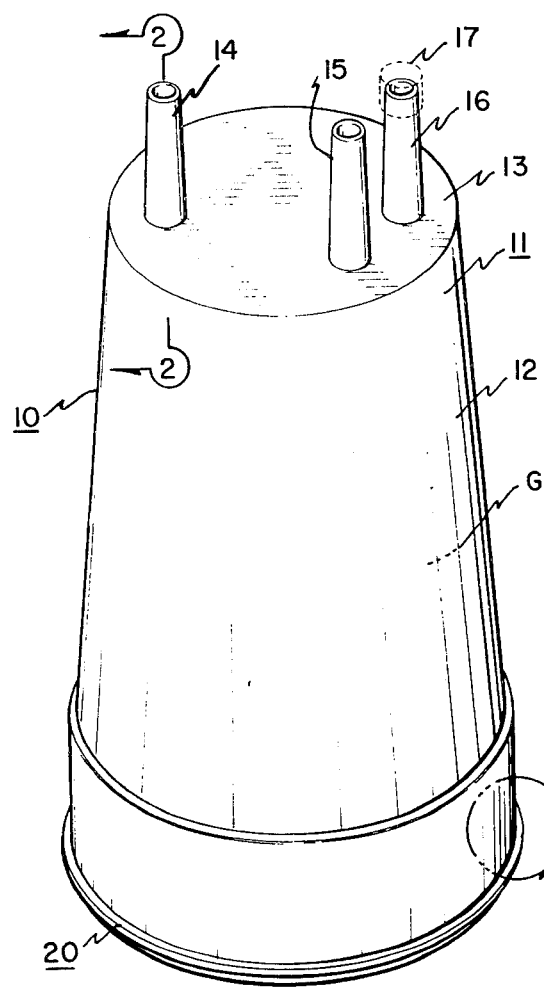
FIG.1
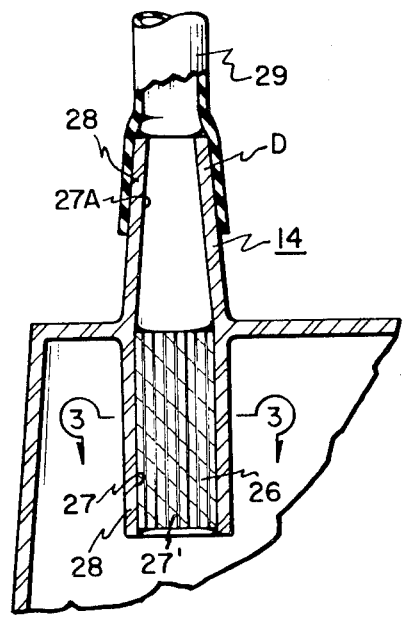
FIG.2
FIG.3
FIG.4A
FIG.4B
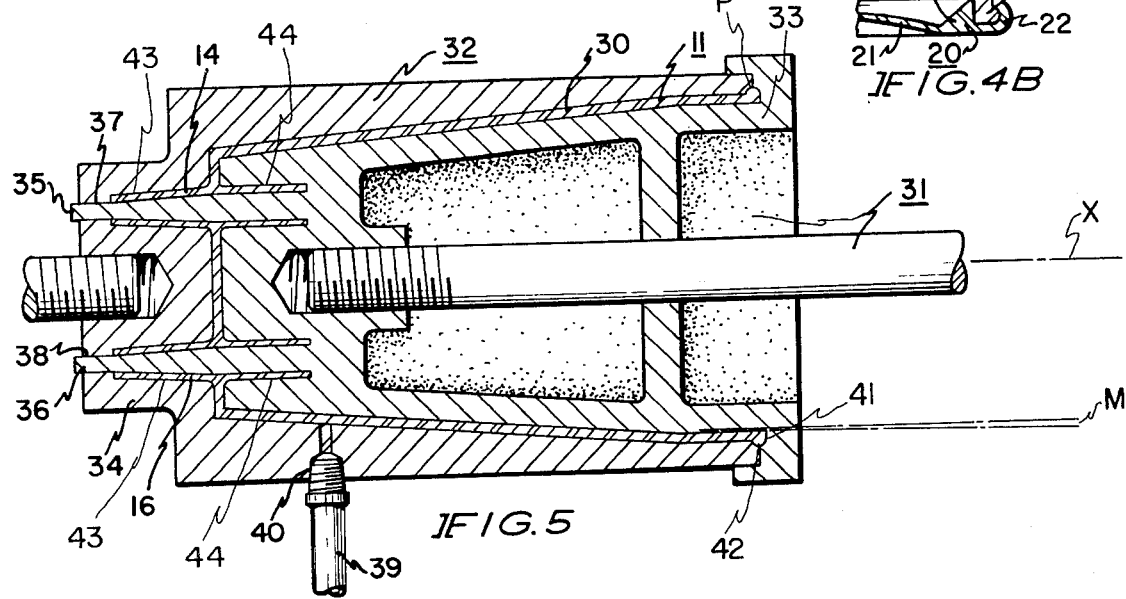
FIG.5

MOLD STRUCTURE FOR FABRICATING FLUID COLLECTION RECEPTACLES

This is a continuation-in-part of a U.S. patent application entitled "Inverted Fluid Collection Receptacle," Ser. No. 98,566, filing date Dec. 16, 1970 and now U.S. Pat. No. 3,738,381.

The present invention relates to mold structures usable in injection molding procedures wherein extremely accurate mold alignment as well as uniform wall thickness of the resulting part may be effectively guaranteed, this through the guide means employed wherein the part to be made is provided with ports by such guide means, the latter being usable to maintain the molds on center-line.

The present invention is particularly useful in fabricating cup-configured containers having their bases or integral tops, as the case may be, provided with elongate connection ports whereby tubing may be connected to the same for effecting vacuum flow, liquid flow, and so forth. Thus, the fabrication of body fluid receptacles are vacuum bottles in vacuum systems in hospitals are uniquely accommodated.

In connection with any vacuum operated device, particularly those in use in medical fields, a prime consideration is to preserve uniformity of wall thickness in the device. This avoids chances of collapse or breakage of the containers at weakened wall areas where non-uniformity in wall thickness exists. As a general rule, for currently produced, cup-configured devices the male or positive mold used in fabricating the device frequently becomes off-center or askew relative to the female or negative mold. Conceptional cup-configured objects do not have holes in their bottoms or bases. The present invention reverses this general approach by in fact providing ports in the base, termed the "top" in the specification hereinafter, of such a container device. The ports are preferably made elongate so as to project on opposite sides of the base or top formation. Such port inclusion permits the pins forming the interior wall of the ports to serve also as guide pins for cooperable guide apertures disposed in the female or negative mold used in fabricating the device. In this way, continuous centerline positioning of the male mold relative to the female mold is assured by virtue of the pins and co-operating guide apertures associated proximate the port area of the container. This avoids the difficulty of the male mold being misaligned, either initially or through the use, off-center or askew relative to the central axis of the negative mold employed in fabricating the device.

The molds employed herein also are designed such that a top bead or formed upper lip can be provided the container, this for providing a snap-fit engagement with a lid designed for positionment thereover.

The molding structure supplies a desired draft angle so that the molds may be easily separated upon the initial curing of the plastic container formed by the molds in a conventional injection molding process.

Accordingly, a principal object of the present invention is to provide new molding structure for molding containers.

An additional object is to provide mold structures for molding a container items wherein uniform wall thickness of the container produces is assured.

An additional object is to provide containers having integral ports, this being accomplished by the provision of positive and negative molds having guide pin means which are usable not only to insure center-line alignment of the molds but also to provide the ports required.

An additional object is to provide mold structure for enabling the plastic or other fabrication of containers having self-contained integral ports and also beads or other desired lip configurations.

The features of the present invention which are believed to be novel are set forth with particularity in the appended claims. The present invention, both as to its organization and manner of operation, together with further object and advantages thereof, may best be understood by reference to the following description taken in connection with the accompanying drawings in which:

FIG. 1 is a perspective view of an enclosure member constructed in accordance with the present invention.

FIG. 2 is an enlarged fragmentary vertical section taken along the line 2—2 in FIG. 1, illustrating the deposition of a valve device within the vacuum port of the enclosure structure.

FIG. 3 is a horizontal cross-section taken along the line 3—3 in FIG. 2.

FIG. 4A is an enlarged fragmentary vertical section of a portion of the enclosure structure of FIG. 1, illustrating the cooperation of the bottom cover with the lip of the enclosure member of the structure before a reduced pressure condition is caused to exist within the enclosure.

FIG. 4B illustrates the structure of FIG. 4A once a reduced pressure condition is produced within the enclosure member of the invention.

FIG. 5 is a longitudinal, vertical section of molding structure which can be used in forming the enclosure member of the container structure of the invention.

In FIG. 1 the receptacle device 10 of the present invention is shown to include an enclosure member 11 having side wall 12 and a top 13 integral therewith. The latter is provided with a series of ports, identified as vacuum port 14, fluid inlet port 15, and a tandem connection port 16. These ports are parallel to each other and to the longitudinal axis X of the enclosure member. Port 16 may be capped by a cap 17 when not in use. Provision of the tandem connection port 16 is to accommodate external valving or external tandem connections when plural ones of the receptacles 10 are to be connected together in tandem to and between a vacuum- or reduced air-pressure producing source, i.e., a vacuum pump, and a source of fluid supply.

The enclosure member 11 is also shown in FIG. 4A to include a lip 18 defining an open base E and being provided with an outwardly extending annular bead F. The lip 18 cooperates with an interior receiving groove 19 associated with the liquid sealing bottom cover 20. See lip P in FIG. 5.

Bottom cover 20 is shown to include a bottom portion 21 which is preferably slightly concave in its nominal configuration. A rim portion 22 is contiguous with bottom portion 21 in the manner illustrated in FIGS. 4A and 4B.

Integrally formed with bottom portion 21 of bottom cover 20 is an interiorly protruding, annularly disposed sealing portion 23. The same has an outside, preferably conically formed surface 24 of which portion H is a sloped continuation, in the manner shown by the dotted line, before the bottom cover 20 is snapped onto the lip of enclosure member 11. Enclosure member 11 is composed of harder material, e.g., acrylic polystyrene "SAN," than the medium density polyethylene preferably comprising bottom cover 20. Thus, when the bottom cover 20 is snapped onto enclosure member 11, portion H' of sealing portion 23 will be compressed inwardly such that there will exist a compression sealing juncture J, existing even before a vacuum is applied. Once a reduced pressure condition is produced within the enclosure, then upper portion K of sealing portion 23 will also be disposed against the inner side wall surface 25. See FIG. 4B.

In sum, when the bottom cover 20 is snapped onto the lip of the enclosure member 11, a seal will exist from point B1 to B2. When a vacuum is applied, the bottom cover 20 will tend to become drawn inwardly relative to the enclosure member, in a manner indicated in FIG. 4B, so that the upper portion at K of sealing surface 24 will also engage the inner wall 25 of enclosure member 11, to point C. When, because of the applied vacuum, liquid enters via port 15, by way of example, the liquid will fall onto the bottom cover 20 so that there will be a slight tendency of the bottom cover to return downwardly to re-open the angle A. However, the common juncture seal from J to point B1 will continue.

There shall next be considered the inclusion of a differential valve device 26 in those ports, such as vacuum port 14, which are to be utilized as vacuum ports, that is, to be connected to a reduced gaseous pressure source such as a vacuum pump. In the embodiment shown the device 26 is simply a perforate plug, cylindrical in form, see FIG. 3, and is pressed into the interior 26 of the lower extension 28 of vacuum port 14.

The device takes the form of a styrofoam plug which is perforated by a series of small holes 27'. Where the fluid to be introduced in the container device 10 is blood or blood containing body fluids, then the holes 27 should be of such a size that they will fit or can be produced by, say, a 20 gauge needle. A series of closely spaced needles may be easily used in a die to punch simultaneously the holes 27' in the plug or valve device.

Of importance in FIG. 2 is the fact that the interior 27A of the vacuum port 14 is tapered. This is for a first purpose of providing a constriction for the valve device or plug 26 such that the same will not proceed into, let alone out of, the vacuum port 14 toward the vacuum producing source. Additionally, the tapered interior 27A provides for uniform wall thickness at D and a tapered exterior at 28, which exterior can accommodate either an elastomeric vacuum conduit tube 29 or some other conduit device provided with a Leur fitting.

As to the construction shown in FIG. 2, it will be observed that when a vacuum is applied as by conduit 29, fluid to be drawn into enclosure member 11 will proceed through the fluid inlet port 15 and into the enclosure G as defined by enclosure member 11 and the liquid sealing bottom cover 20. Parenthetically, it is to be observed that the bottom cover 20, preferably made of a medium density polyethylene, will be sufficient to produce quite an effective vacuum seal at the juncture 19, and most certainly will be effective for fluid once the same is contained therewithin. The strength of the bottom cover should be such that the weight of the fluid will not tend to depress significantly the configuration of bottom cover 20 from that condition shown in FIG. 4B.

FIG. 5 indicates a method of fabrication of enclosure member 11, whereby to insure that the wall thickness at 30 of enclosure member 11 is preserved. One prior method of making cup-configured enclosures is simply to provide positive and negative mold to form the space defining the cup-configuration. Normally, such misalignments as may occur between the positive and negative molds are not objectionable since uniformity of wall thickness is not critical. In the case of vacuum operated containers, however, it is essential in order to preserve the configuration against collapse of a portion of the wall, due to non-uniformity of wall thickness, that the positive and negative molds be maintained strictly on centerline during the injection molding process associated with fabrication of the container.

It is noted that all of the design features of the enclosure member 11 in combination with bottom cover 20 co-act together to great advantage. FIG. 5 illustrates that positive and negative molds 31 and 32 are respectively provided with mold members 33 and 34. These are suitably configured and provided with a mold withdrawal draft angle M as shown in FIG. 5, to form the enclosure member as well as the elongate ports 14 and 16. Note that since the ports, e.g., 14 and 16, are included the same can be formed by pins 35 and 36 which are integral with mold member 33. But these are also used as guide pins which proceed into corresponding guide apertures 37 and 38, respectively, of mold member 34; hence, the cooperation of the pins and guide apertures 35–38 assure that the positive mold 31 will be maintained on centerline with respect to the negative mold 32, thereby insuring the uniformity of wall thickness 30 relative to enclosure member 11. Accordingly, there is assured the condition of uniformity of wall thickness so that a chancing of collapse of the container at any weakened area, weakened because of an inadvertently produced reduced wall thickness, is avoided. Mold members 33 and 34 are recessed at 41 and 42 to provide for container bead or lip 43.

The bottom cover 20, in being disposed at the bottom rather than at the top of the container, insures that a vacuum seal need be produced only for a limited time, that is, for the time required to introduce fluid into the container. Once liquid is at the bottom of the container, then a vacuum seal, strictly speaking, is not required. However, it must be noted that an extremely effective seal for all fluids is produced by virtue of the interconnection between bottom cover 20 and enclosure member 11. Especially is this true in the case of the provision of annular protrusion 23 which acts as an effective seal against the interior wall of enclosure member 11, when a vacuum is applied, so as to draw upwardly the central portion of bottom portion 21 relative to the remainder of the closure structure. The ports 14–16, in being provided the top (or base portion) 13, serve ideally not only as conduit connections but also to accommodate pins 35 and 36, which pins assure uniformity in wall thickness relative to wall 30 of the enclosure member 11. Liquid plastic feed stock, of course, will be introduced via feed conduit 39 which is connected by threads or otherwise at 40 to the negative mold 32.

Accordingly, it is seen that the present invention has provided vacuum operable liquid enclosure structure which is ideally suited for the collection of liquids such as a patient's body fluid in a hospital. Special note is to be made that the differential valve device 26 is simply fixed, involves no moving parts, and serves as a block to liquid such as blood, whereas the small holes 27' in FIG. 3 permit the interior of the container or enclosure member 11 to be evacuated as before described.

As to enclosure-lid seal, it is seen that the seal is maximized when a vacuum seal is needed, that is, when the reduced pressure is initially applied to facilitate the drawing up of fluid for disposition within the container. Once the fluid or liquid drops into the container so as to cover the bottom, then so great a seal need not be continued. Hence, it is permissible for the weight of the liquid to restore to some degree the configuration of the bottom cover 20.

Should the receptacle construction be inverted, such that the ports are a part of the cover 20, then "bottom portion" 21 will simply be considered central portion of the cover 20.

In FIG. 5, the port extensions 14 and 16, both interior and exterior of the container, are shown to be formed by the provision of recesses or grooves 43 and 44, the former being contiguous with guide bores or apertures 37, and 38.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A port-including container-producing mold apparatus including, in combination, unitary, elongate, positive mold means for forming the interior surface of a container and also the interior surfaces of port extensions to be integrally formed with said container; and negative mold means for forming the exterior surfaces of said container and port extensions, said positive and negative mold means being provided with inter-cooperating elongated pin means and guide aperture means, respectively, for constraining said positive and negative mold means to predetermined, fixed-axis axial movement, whereby to assure desired wall formation of said container, said pin means being integral with said positive mold means and extending parallel to the longitudinal axis of said positive mold means, said negative mold means being relieved about solely a portion of said pin means to form mold cavity means for said port extensions.

2. The apparatus of claim 1 wherein said negative mold means is provided with said guide apertures as said guide aperture means, said pin means forming extension means of said positive mold means extending through and forming interiors of said port extensions.

3. The structure of claim 2 wherein said negative mold means includes annular, port-extension material-receiving recesses respectively contiguous with and enlarged with respect to said guide apertures.

4. The structure of claim 2 wherein said pin means are each annularly spaced from the remainder of said positive mold means by an annular, mold-material receiving port-extension groove.

5. The structure of claim 3 wherein said pin means are each annularly spaced from the remainder of said positive mold means by an annular, mold-material receiving port-extension groove.

6. Container-producing apparatus including, in combination an elongate positive mold having integral, axially outwardly extending, port-forming guide pins parallel to the longitudinal axis of said positive mold; and a negative mold having guide apertures slideably receiving said guide pins, said negative mold also being provided with exterior port-surface-forming recesses contiguous with and circumscribing said guide apertures.

7. The structure of claim 6 wherein said positive mold is provided with annular port-forming grooves circumscribing said guide pins.

* * * * *